US009703802B1

(12) United States Patent
Ward

(10) Patent No.: US 9,703,802 B1
(45) Date of Patent: Jul. 11, 2017

(54) WEB-NATIVE MAINTAINED MEDIA FILE FORMAT

(71) Applicant: Amazon Technologies, Inc., Reno, NV (US)

(72) Inventor: Miles Julian Ward, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 459 days.

(21) Appl. No.: 14/015,922

(22) Filed: Aug. 30, 2013

(51) Int. Cl.
*G06F 12/00* (2006.01)
*G06F 17/30* (2006.01)

(52) U.S. Cl.
CPC .............................. *G06F 17/30194* (2013.01)

(58) Field of Classification Search
CPC ................................................ G06F 17/30194
USPC .......................................................... 707/827
See application file for complete search history.

(56) References Cited

U.S. PATENT DOCUMENTS

| | | | | |
|---|---|---|---|---|
| 6,211,974 B1 * | 4/2001 | Haneda | ................ | G11B 27/034 348/526 |
| 6,469,737 B1 * | 10/2002 | Igarashi | ............. | H04N 5/23203 348/14.1 |
| 6,628,417 B1 * | 9/2003 | Naito | .................... | G06F 3/1208 358/1.15 |
| 6,980,668 B1 * | 12/2005 | Naito | .................... | G06T 1/0021 380/54 |
| 7,181,480 B1 * | 2/2007 | Nikiel | ................ | G06F 17/30265 |
| 7,444,354 B2 * | 10/2008 | Kaburagi | .......... | G06F 17/30265 |
| 2001/0009454 A1 * | 7/2001 | Manico | .............. | H04N 1/00132 355/41 |
| 2002/0051189 A1 * | 5/2002 | Usami | ................ | H04N 1/00188 358/1.15 |
| 2002/0103860 A1 * | 8/2002 | Terada | ................... | G06Q 30/02 709/203 |
| 2003/0002848 A1 * | 1/2003 | Kawaoka | ........... | H04N 1/00132 386/223 |
| 2003/0179405 A1 * | 9/2003 | Seto | .................... | H04N 1/00132 358/1.15 |
| 2008/0114680 A1 * | 5/2008 | Toutonghi | .......... | G06Q 30/0601 705/50 |
| 2008/0209533 A1 * | 8/2008 | Abrams | .............. | G06F 17/3089 726/9 |
| 2008/0282296 A1 * | 11/2008 | Kawai | .................... | H04N 5/232 725/62 |

(Continued)

OTHER PUBLICATIONS

Berners-Lee, T. , "Universal Resource Identifiers in WWW: A Unifying Syntax for the Expression of Names and Addresses of Objects on the Network as used in the World-Wide Web," Network Working Group, IETF RFC 1630, Jun. 1994, 24 pages.

*Primary Examiner* — Tony Mahmoudi
*Assistant Examiner* — Michael Le
(74) *Attorney, Agent, or Firm* — Kilpatrick Townsend & Stockton LLP

(57) ABSTRACT

Methods and systems for managing media objects by maintaining one unique location that the media object is stored to and accessible from. A media object is received by a computing system and a unique uniform resource identifier is determined based at least in part on identification information corresponding to the media object. The identification information is requested from a remote identification information maintenance service. The media object is provided to a storage location corresponding to the determined unique uniform resource identifier.

23 Claims, 11 Drawing Sheets

(56) References Cited

U.S. PATENT DOCUMENTS

| | | | | |
|---|---|---|---|---|
| 2009/0002361 | A1* | 1/2009 | Dote | G06F 9/4443 345/418 |
| 2009/0150480 | A1* | 6/2009 | Xia | H04L 65/602 709/203 |
| 2009/0150570 | A1* | 6/2009 | Tao | H04L 67/06 709/249 |
| 2009/0199077 | A1* | 8/2009 | Sar | G06F 17/30896 715/201 |
| 2009/0240582 | A1* | 9/2009 | Sheldon-Neal | G06Q 30/02 705/14.39 |
| 2010/0029326 | A1* | 2/2010 | Bergstrom | G11B 27/11 455/556.1 |
| 2010/0277611 | A1* | 11/2010 | Holt | G06F 17/30265 348/231.2 |
| 2010/0283586 | A1* | 11/2010 | Ikeda | H04N 1/00007 340/10.42 |
| 2011/0060793 | A1* | 3/2011 | Wheeler | G06Q 10/00 709/203 |
| 2011/0183655 | A1* | 7/2011 | Cao | G06Q 10/10 455/414.1 |
| 2012/0197886 | A1* | 8/2012 | Saitou | G06F 17/30879 707/736 |
| 2012/0229672 | A1* | 9/2012 | Cok | H04N 5/765 348/231.2 |
| 2013/0169985 | A1* | 7/2013 | Inomata | G06F 21/608 358/1.13 |
| 2014/0067883 | A1* | 3/2014 | Fujita | G06F 17/30123 707/821 |
| 2014/0074836 | A1* | 3/2014 | Adams | G06F 17/30997 707/736 |
| 2014/0258349 | A1* | 9/2014 | Meltzer | G06F 17/30194 707/827 |
| 2014/0270129 | A1* | 9/2014 | Bracken | H04M 3/56 379/202.01 |

* cited by examiner

WEB-NATIVE MAINTAINED MEDIA FILE FORMAT

BACKGROUND

Photographs and related media objects can now be captured by a variety of devices including mobile telephone devices, mobile computing devices, camcorders, and digital cameras. Some of the aforementioned devices have the capability to store the information associated with the media objects in local memory where they can later be uploaded to media sharing websites, social networking websites, or utilized in web development. Conventional systems and methods for providing media objects through such channels however have various deficiencies. For example, sharing or providing a photograph via a social networking site can result in multiple copies of the photograph existing on the World Wide Web and the local device which served as the source of the photograph. Multiple copies of a photograph can increase the time required to maintain information associated with the photograph and/or later recalling said information. In addition, integrating photographs or media objects into web development projects can require conforming the media object to the standards required by the various web development languages, standards, and/or protocols.

BRIEF DESCRIPTION OF THE DRAWINGS

Various embodiments in accordance with the present disclosure will be described with reference to the drawings, in which.

DETAILED DESCRIPTION

Figure 1:
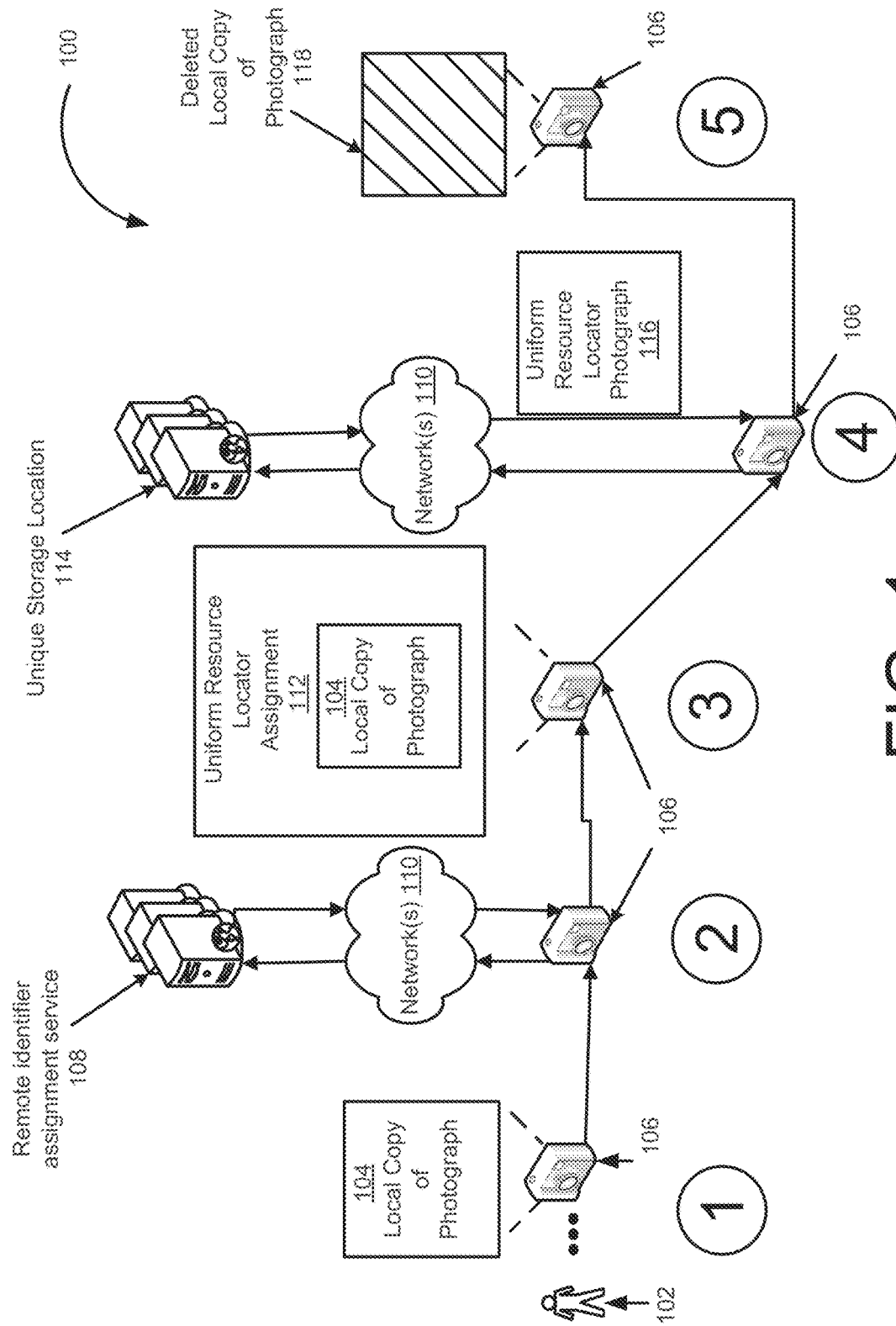
FIG. 1 is a data flow diagram illustrating an example data flow for managing and maintaining web-native media objects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for maintaining a web-native format of media objects. In some examples, the web-native format is maintained and enforced at least in part by assigning a unique uniform resource locator (URL) to the media object as the media objects file name. The computer device or capture device of the media object can then attempt to move or provide the media object to the location corresponding to the URL. The computer device or capture device attempts to move the media object continuously, as long as it is connected to one or more public networks, until the move is complete. After the media object has been moved to the location identified in the file name local cache versions of the media object can be deleted. In accordance with at least one embodiment, the computer device or capture device can limit or throttle its continuous moving or uploading activity depending on certain user specified flags or tags. For example, if the media capture device is a mobile telephone, the user may not wish to exhaust their entire data plan to fulfill the upload request. In some examples, a user may specify the speed and timing of the upload or communication to the unique URL of the media object.

In accordance with at least one embodiment, a uniform resource identifier (e.g., a URI and/or a uniform resource identifier in accordance with T. Berners-Lee, "Universal Resource Identifiers in WWW," IETF RFC 1630, June 1994) can be assigned or associated with a media object. A media object can be any suitable data object and/or structure that is capable of being captured by a media capture device/user device or communicated to the media capture device/user device. Examples of suitable media objects include an audio file, a photograph, a digital photograph, a movie file, a video stream file, an audio stream file, and generally any suitable media files known in the art. In accordance with at least one embodiment, suitable media objects can include stereolithography (STL) files associated with 3D printing/scanning. For example, a unique URI or URL could indicate a location of a 3D printer which in turn may create/print the object, where the indication could occur via a 3D printer that is communicated with via one or more public networks. In accordance with at least one embodiment, a media capture device can include a 3D scanner which may create a STL file that is then assigned a unique URL or URI to which the 3D scanner will continuously attempt to provide the STL to the location indicated by the unique URL or URI. In accordance with at least one embodiment, the storage location identified by the unique URL or URI can include locations within virtual environments such as video games. In an embodiment, media objects associated with a virtual environment or video game, such as a player avatar, may be captured by a media capture device or computing system which may then be assigned a unique URL or URI. In an example, this would allow a user to share their player avatar which is normally only accessible through the game environment through other media formats via the unique URL or URI associated with the player avatar media object. Examples of suitable media capture devices and user devices include a digital camera, a camera, a camcorder, a mobile telephone device, a mobile computer, a desktop computer, or a video game device. Some devices that capture media objects may also communicate the media objects to one or more computers or applications that can configure the media object to be uploaded to a storage location. The communication can occur over one or more networks such as the internet and local area networks and can include local communication between a mobile memory device such as a secure digital (SD) card and any suitable computing device. In accordance with at least one embodiment, the media object in its web-native format, and/or after it has been associated or assigned a unique URI, can be propagated through a series of intermediaries, including proxies and caches, to its ultimate destination.

In accordance with at least one embodiment, a user can register for a unique URI or URL through a remote identifier assignment service or a remote identification information maintenance service. A user can provide a unique username and personal identification information which can be associated with the unique username. The remote services may also provide, upon request, an increment or counter value associated with the service provider and unique username. The user can also register for a unique URI or URL through a service provider or third party service provider that does not maintain the unique increment or counter value. In some examples, the unique increment or counter value can include any suitable alpha numeric string and is not limited to numeric values alone. The remote identifier assignment service or remote identification information maintenance service can be hosted or provided by an internet resource provider or domain name service. In accordance with at least one embodiment, the user can also associate one or more aliases with the unique username or unique URI or URL during registration. In still other embodiments, registration can occur on a web site associated with the remote identification information maintenance service or remote identifier assignment service. In some examples an application that is associated with the above services may be utilized by a user to register. In accordance with at least one embodiment, although a URL or URI may be assigned or associated with a media object, the metadata associated with the media object may remain intact or, in accordance with at least one embodiment, is stored by an application or in local memory of the media capture device/user device. Metadata associated with a media object may include file format, time and date information, geo location, file size, and/or thumbnail/visually associated image.

In accordance with at least one embodiment, an application on a media capture device/user device can detect or receive a new media object. The application may then assign or associate a URL or URI that includes a temporary increment or counter value. The temporary increment or counter value can be maintained by the application or stored in the memory of the media capture device/user device. In an example, the media capture device/user device may then attempt to request the actual increment or counter value associated with the unique username or device from the remote identifier assignment service or remote identification information maintenance service. The actual increment or counter value received as a result of the request can then be utilized by the application to assign or associate the unique URL or URI with the media object. As described above, the media capture device/user device may, in accordance with at least one embodiment, continuously attempt to move or provide the media object to the location identified by the unique URL or URI via one or more public networks. In accordance with at least one embodiment, the nature of the actual increment or counter value can make programming or coding in third party applications easier, for example, more efficient and/or effective. The web-native format and/or the format of the unique URI enable the media object to be easily integrated into an application programming interface (API) and, in accordance with at least one embodiment, the structure of the unique URI can serve as a type of API.

In accordance with at least one embodiment, a user may be prompted or may have previously specified a number of options associated with communicating the media object to the storage location identified by the unique URL or URI. In an example, the user may specify a number of flags which dictate the behavior of the upload or of the media objects storage on the media capture device/user device. For example, a user may wish to maintain a local copy of a particular media object in addition to storing it at the location identified by the unique URL or URI. The user may also wish to specify upload preferences, including bandwidth limits. In accordance with at least one embodiment, although some examples are described utilizing a unique URL or URI, a unique address may also be created for a user device. In accordance with at least one embodiment the user device can serve as the location identified by the URL and may receive media objects when it is connected to one or more public networks. In accordance with at least one embodiment, a user may be presented with an option of permanently deleting the media object that has been stored at the unique URL or URI. In accordance with at least one embodiment, the user may wish to change the service provider of their unique URL or URI. The user can interact with the service provider to ensure that one or more future media objects will be located at the new unique URL or URI, or the user may transfer all media objects from one unique URL or URI to the new storage location depending on the user's preference. In accordance with at least one embodiment, once the user has obtained a unique username and has provided several media objects to the storage location, the media objects can be accessed via an easily accessible gallery utilizing the counter values. In accordance with at least one embodiment, media galleries may be incorporated into social networking sites and/or web development at least in part because a user can merely enter the URL or URI and a range of counter values to be served the appropriate media objects.

FIG. 1 depicts an illustrative data flow 100 with which techniques for maintaining web-native format of media objects may be described. As shown, the illustrative data flow 100 includes five operations. However, the numbers associated with the operations are for explanation purposes only as the operations can be performed out of order and/or in any order that is suitable. A user 102 may capture a photograph 104 with a digital camera and/or media capture device 106 and assign or associate a temporary counter value to the local copy of the photograph as depicted in operation 1. In accordance with at least one embodiment, the user may use an application or native code configured to run on a computing system that can capture and assign unique URLs or URIs to the photograph or media object. The example data flow depicted in FIG. 1 assumes that the user 102 has already registered for a unique username from a remote identifier assignment service or from a remote identification information maintenance service. The data flow 100 may continue in operation 2 with a request for a unique counter value by the digital camera 106 to a remote identifier assignment service 108 via one or more public networks 110. The data flow 100 may continue in operation 3 with the digital camera or capturing device 106 creating and then assigning or associating a URL 112 to the local copy of the photograph 104 utilizing the requested unique counter value and replacing the temporary counter value in operation 1 and the above mentioned unique username. Examples of unique URLs are described below with reference to FIG. 4.

The data flow 100 may continue at operation 4 by moving and/or providing the photograph to the unique storage location 114 indicated by the photograph's newly assigned identifier (e.g., unique URL 116) via one or more public networks 110 by the digital camera or capturing device 106. A "unique storage location" as used in the present disclosure, is a storage location referenced by a unique URI. Such a unique storage location may be implemented with one or more physical storage locations, and the physical storage locations may change over time. The digital camera or capturing device 106 may continuously attempt to move the photograph 116 to its indicated unique storage location 114 until the process is complete and as long as the device 106 and location 114 are accessible via one or more public networks 110. Although in this example the unique storage location 114 is different from the remote identifier assignment service 108, in accordance with at least one embodiment the remote identifier assignment service 108 may maintain a storage location corresponding to the unique URL. In accordance with at least one embodiment, while a unique URL is being described, a unique URI could also have been created and assigned to the photograph and the photograph could then be moved or provided to the location identified by the URI. The data flow 100 may conclude at operation 5 by deleting local cache copies or temporary copies of the photograph 118. As result of operation 5 only one copy of the photograph 104 exists and it is stored at the unique URL associated/assigned to the photograph. In accordance with at least one embodiment, the deletion described in operation 5 can occur at a later time, for example, utilizing a suitable garbage collection technique.

While, for the purpose of illustration, a photograph captured by a digital camera is presented in FIG. 1, embodiments of the present disclosure are applicable for other media files and user devices as well. For example, in one example, the user may capture a photograph with a camera that cannot communicate across one or more public networks. Instead, a user may remove the SD card of the camera and transfer the photo to a computing device which may then perform the operations as described with reference to FIG. 1. In addition, the photograph may be another type of media file such as a movie file, an mp3, an audio file, or any suitable media object. Each of the capturing devices or other file types may be perform the operations as described with reference to FIG. 1.

Figure 2:
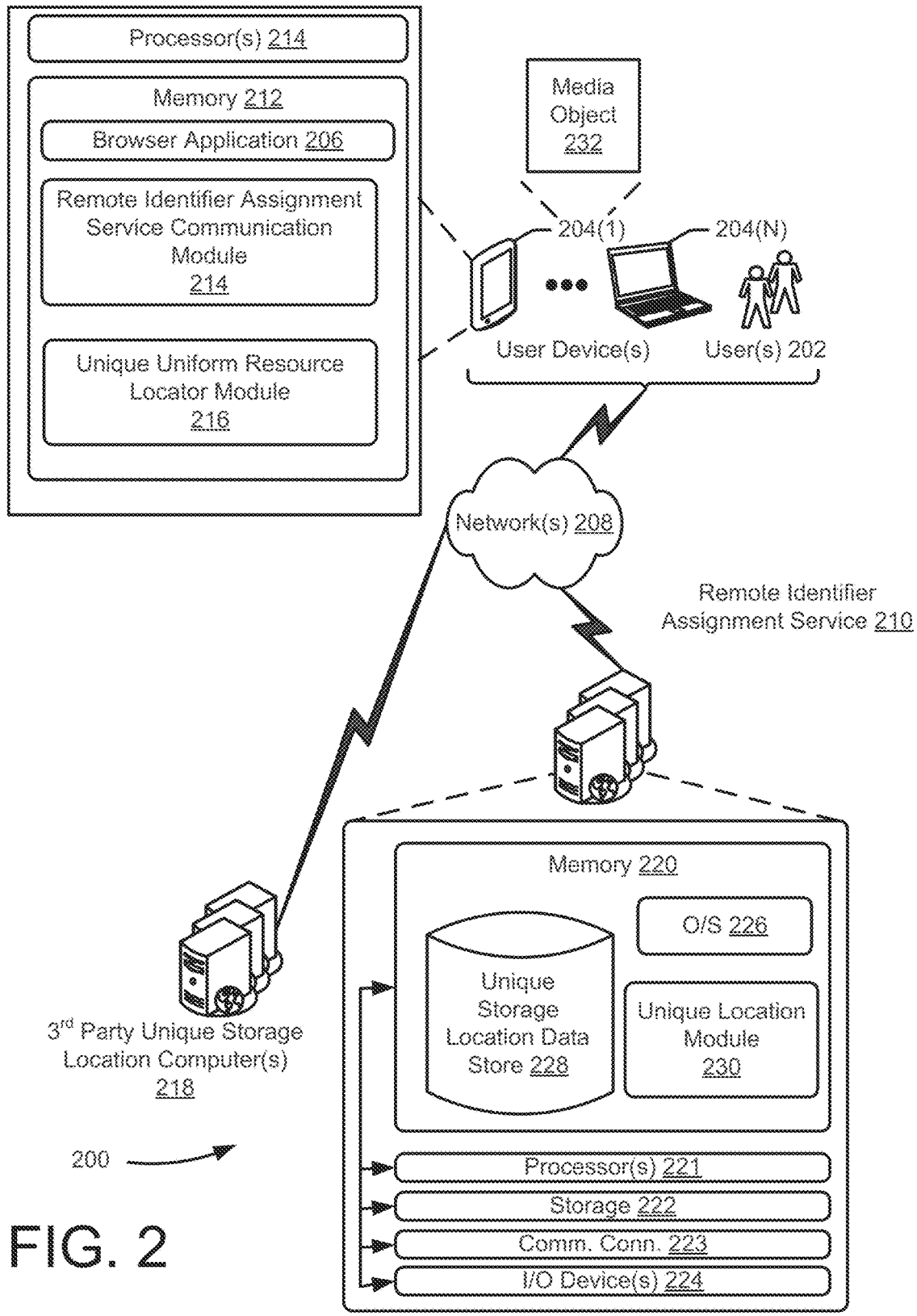
FIG. 2 is a schematic diagram depicting aspects of an example web-native maintenance facility in accordance with at least one embodiment.

FIG. 2 depicts an illustrative system and/or architecture 200 in which techniques for maintaining a web-native format of media objects may be implemented. In architecture 200, one or more users 202 may utilize user computing devices 204(1)-(N) (collectively, user devices 204) to access a browser application 206 (e.g., a web browser) or a user interface (UI) accessible through the browser application 206, via one or more networks 208. The "browser application" 206 can be any suitable browser control or native application that can access and display a web page or other information. In accordance with at least one embodiment, the browser application 206 may be utilized to register a unique username from a service provider or to view the media file by entering the unique URL associated with the media file into the browser application as described above. In accordance with at least one embodiment, the browser application 206 may be hosted, managed, and/or provided by a service provider or remote identifier assignment service 210. The one or more service provider computers 210 may, in some examples, provide computing resources such as, but not limited to, client entities, low latency data storage, durable data storage, data access, management, virtualization, cloud-based software solutions, electronic content performance management, etc. The one or more service provider computers 210 may also be operable to provide web hosting, computer application development, and/or implementation platforms, combinations of the foregoing, or the like to the one or more users 202. The one or more service provider computers 210 may also maintain and provide unique counter values, increment values, or other suitable media object identification information. Examples of suitable media object identification information include alphanumeric strings, pseudo-random values, and/or identifiers that are unique on a global, per-service or per-user basis. In accordance with at least one embodiment, media object identification information may incorporate and/or encode information with respect to a source of the identified media object such as a capture device identifier, a capture time and/or a capture location. In accordance with at least one embodiment, media object information may incorporate one or more outputs of one or more cryptographic hashing functions. For example, such hashing functions may be applied to inputs including the media object, one or more properties of the media object, a digital format of the media object, and/or any suitable portion and/or combination thereof. The one or more service provider computers 210 may also serve as the unique storage location identified by the assigned or associated URL/URI for a media object.

In one illustrative configuration, the user devices 204 may each include at least one memory 212 and one or more processing units or processor(s) 214. The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 212 may store program instructions that are loadable and executable on the processor(s) 214, as well as data generated during the execution of these programs. Depending on the configuration and type of user device 204, the memory 212 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM. As will be appreciated by one of skill in the art, the user devices 204 may be distributed and/or virtual.

Turning to the components of the memory 212 in more detail, the memory 212 may include an operating system and one or more application programs or services for implementing the features disclosed herein including assigning a temporary counter value, requesting a unique counter value, creating or associating a unique URL or URI to a media object, and communicating the media object to the storage location indicated by the unique URL or URI. Turning to the contents of the memory 212 in more detail and as will be described in further detail with reference to FIGS. 5 and 6, the memory 212 may include one or more application programs or services for implementing the features disclosed herein including a remote identifier assignment service communication module 214 and a unique uniform resource locator module 216. In accordance with at least one embodiment, the remote identifier assignment service communication module 214 may obtain or request a unique counter value or identification information via networks 208 from the remote identifier assignment service 210 or a third party unique storage location computer 218. The unique uniform resource locator module 216 may utilize the unique counter obtained or requested my module 214 and create/assign or associate the unique URL to a media object and communicate the media object to the remote identifier assignment service 210 or the third party unique storage location 218. The browser application 206 may be configured to display or present a username registration page as will be described further with reference to FIG. 3, display a media object corresponding to a unique URL or URI entered into the browser application 206, or other interface for interacting with the one or more service provider computers 210. Additionally, the memory 212 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 202 provided response to a security question or a geographic location obtained by the user device 204.

In some examples, the networks 208 may include any one or a combination of many different types of suitable networks, such as cable networks, the Internet, wireless networks, cellular networks and other private and/or public networks. While the illustrated example represents the users 202 accessing the browser application 206 over the networks 208, the described techniques may equally apply in instances where the users 202 interact with the one or more service provider computers 210 via the one or more user devices 204 over a landline phone, via a kiosk, or in any other suitable manner. In accordance with at least one embodiment, the described techniques may apply in other client/server arrangements (e.g., set-top boxes, etc.), as well as in non-client/server arrangements (e.g., locally stored applications, etc.). Additionally, the users 202 interact with one or more user devices 204 via a local area network or communication with a local memory module of the various user devices 204 to store media files to unique location.

As described briefly above, the browser application 206 may allow the users 202 to interact with the one or more service provider computers 210, such as to access web content like web pages, registration pages, or the presentation of media objects. The one or more service provider computers 210, perhaps arranged in a cluster of servers or as a server farm, may host the browser application 206 and/or cloud-based software services. Other server architectures may also be used to host the browser application 206 and/or cloud-based software services. The browser application 206 may be capable of handling requests from many users 202 and serving, in response, various user interfaces that can be rendered at the user devices 204 such as, but not limited to, a website or web page. The browser application 206 can interact with any suitable type of website that supports user interaction, including social networking sites, electronic retailers, informational sites, blog sites, search engine sites, news and entertainment sites, and so forth. The described techniques can similarly be implemented outside of the browser application 206, such as with other applications running on the user device 204.

The one or more service provider computers 210 may be any suitable type of computing device such as, but not limited to, a mobile phone, a smart phone, a personal digital assistant (PDA), a laptop computer, a desktop computer, a server computer, a thin-client device, a tablet PC, etc. Additionally, in accordance with at least one embodiment, the one or more service provider computers 210 may be executed by one or more virtual machines implemented in a hosted computing environment. The hosted computing environment may include one or more rapidly provisioned and released computing resources, which computing resources may include computing, networking, and/or storage devices. A hosted computing environment is sometimes referred to as a cloud computing environment. In some examples, the one or more service provider computers 210 may be in communication with the user device 204 via the networks 208, or via other network connections. The one or more service provider computers 210 may include one or more servers, perhaps arranged in a cluster or as individual servers not associated with one another. The one or more service provider computers 210 may be in communication with one or more third party computers 218 via networks 208. The one or more service provider computers 210 that host the browser application 206 may obtain and provide data to third party computers 218 via networks 208 in accordance with embodiments described herein.

In one illustrative configuration, the one or more service provider computers 210 may include at least one memory 220 and one or more processing units or processors(s) 221. The processor(s) 221 may be implemented as appropriate in hardware, computer-executable instructions, firmware, or combinations thereof. Computer-executable instruction or firmware implementations of the processor(s) 221 may include computer-executable or machine-executable instructions written in any suitable programming language to perform the various functions described. The memory 220 may store program instructions that are loadable and executable on the processor(s) 221, as well as data generated during the execution of these programs. Depending on the configuration and type of the one or more service provider computers 210, the memory 220 may be volatile (such as RAM) and/or non-volatile (such as ROM, flash memory, etc.). The one or more service provider computers 210 or servers may also include additional storage 222, which may include removable storage and/or non-removable storage. The additional storage 222 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 220 may include multiple different types of memory, such as SRAM, DRAM, or ROM.

The memory 220, the additional storage 222, both removable and non-removable, are all examples of computer-readable storage media. For example, computer-readable storage media may include volatile or non-volatile, removable or non-removable media implemented in any suitable method or technology for storage of information such as computer-readable instructions, data structures, program modules, or other data. The memory 220 and the additional storage 222 are all examples of computer storage media. Additional types of computer storage media that may be present in the one or more service provider computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other suitable medium which can be used to store the desired information and which can be accessed by the one or more service provider computers 210. Suitable combinations of any of the above should also be included within the scope of computer-readable media. Alternatively, computer-readable communication media may include computer-readable instructions, program modules, or other data transmitted within a data signal, such as a carrier wave, or other transmission. However, as used herein, computer-readable storage media does not include computer-readable communication media.

The one or more service provider computers 210 may also contain communication connection(s) 223 that allow the one or more service provider computers 210 to communicate with a stored database, another computing device or server, user terminals and/or other devices on the networks 208. The one or more service provider computers 210 may also include I/O device(s) 224, such as a keyboard, a mouse, a pen, a voice input device, a touch input device, a display, speakers, a printer, etc.

Turning to the contents of the memory 220 in more detail and as will be described in further detail with reference to FIG. 7, the memory 220 may include an operating system 226, one or more data stores 228, and/or one or more application programs or services for implementing the features disclosed herein including a unique location module 230. In accordance with at least one embodiment, the unique location module 230 may be responsible for registering and maintaining unique usernames, maintaining and assigning counter values or identification information, and storing the received media objects in one or more data stores 228. When a user 202 registers for a unique username via the browser application 206, the browser application 206 may be configured to request from the one or more service provider computers or the remote identifier assignment service 210 a unique username. The user 202 may then capture a media object 232 utilizing a user device 204 and have the media object 232 assigned a temporary counter value by the remote identifier assignment service communication module 214 that is then associated with the username and domain space name provided by the one or more service provider computer 210. The module 214 may then request from the remote identifier assignment service 210 an actual counter value which may then replace the temporary counter value. The user device 204 either through an application or native code may then assign or associate a unique URL or URI to the media object 232 via the unique uniform resource locator module 216 and then attempt to move the media object 232 via networks 208 to the storage location indicated by the unique URL or URI. The storage location can be the third party unique storage location computers 218 or the remote identifier assignment service 210. A user 202 who wishes to view or present the media object 232 may then enter the unique URL or URI which includes the actual counter value into a browser application 206 or other applicable application.

Figure 3:
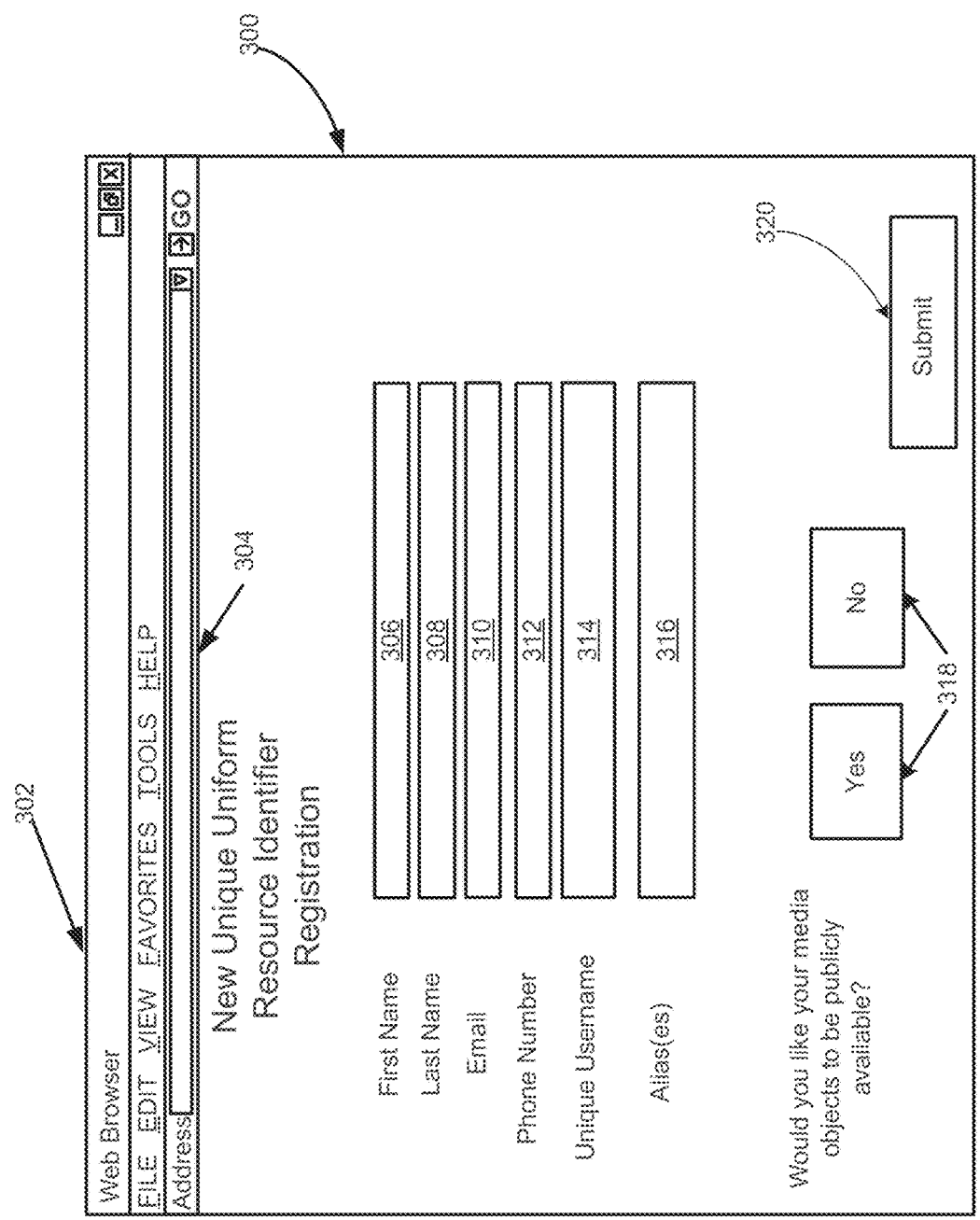
FIG. 3 is a user interface diagram illustrating an example unique uniform resource identifier registration web page in accordance with at least one embodiment.

FIG. 3 depicts an example unique uniform resource identifier registration web page in accordance with at least one embodiment. In this particular example, the registration web page 300 is presented using a web page displayed on a web browser interface 302. The web page illustrated in FIG. 3 includes an address bar 304 where a user may enter a URL, and personal identification information where the user may enter information such as a first name 306, a last name 308, an email address 310, a phone number 312. Additionally, the web page illustrated in FIG. 3 includes a field for entering a unique username 314 and one or more aliases 316 along with an option to make all media provided with this username publicly available 318. Finally a submit button 320 is included in the web page 300 illustrated in FIG. 3 that the user can click on to complete their part of the registration. The registration web page 300 may be hosted or provided by the one or more service provider computers 210 as described above with reference to FIG. 2. In accordance with at least one embodiment, while the registration is discussed in this example as utilizing a web page interface, any suitable user friendly interface known in the art may be utilized such as graphical user interfaces (GUIs), mobile phone applications, etc.

While, for the purpose of illustration, a set of information fields have been provided to allow a user to register for a unique username or domain space are presented in FIG. 3, embodiments of the present disclosure are applicable in other contexts as well. For example, in one example, fewer or more information fields may be presented to a user to allow them to register for a unique username or domain space. In an alternative example, certain fields may be pre-filled with information obtained from the user's browser or browser cookies. In another alternative embodiment, certain fields such as the unique username may include pre-generated available user names that the user may choose from. In one example, a user enters the URL for the registration web page in the address bar 304 of a web browser 302 and is presented with the new username or domain space registration page 300. In accordance with at least one embodiment, the user fills the personal identification information fields 306-312, the unique username and aliases 314, 316, and selects one of the options for publicly available data 318. After the user has entered the information required to register a unique username he/she may click on the submit button 320 to complete the registration. In accordance with at least one embodiment, the one or more service provider computers 210 verify the unique username, associated the one or more aliases with the username and indicate to the user that registration is complete and provide an example URL or URI that can be utilized to display media objects associated with the unique username in an address bar or other application. Examples of URLs or URIs associated with the username or aliases will be discussed below with reference to FIG. 4.

Figure 4:
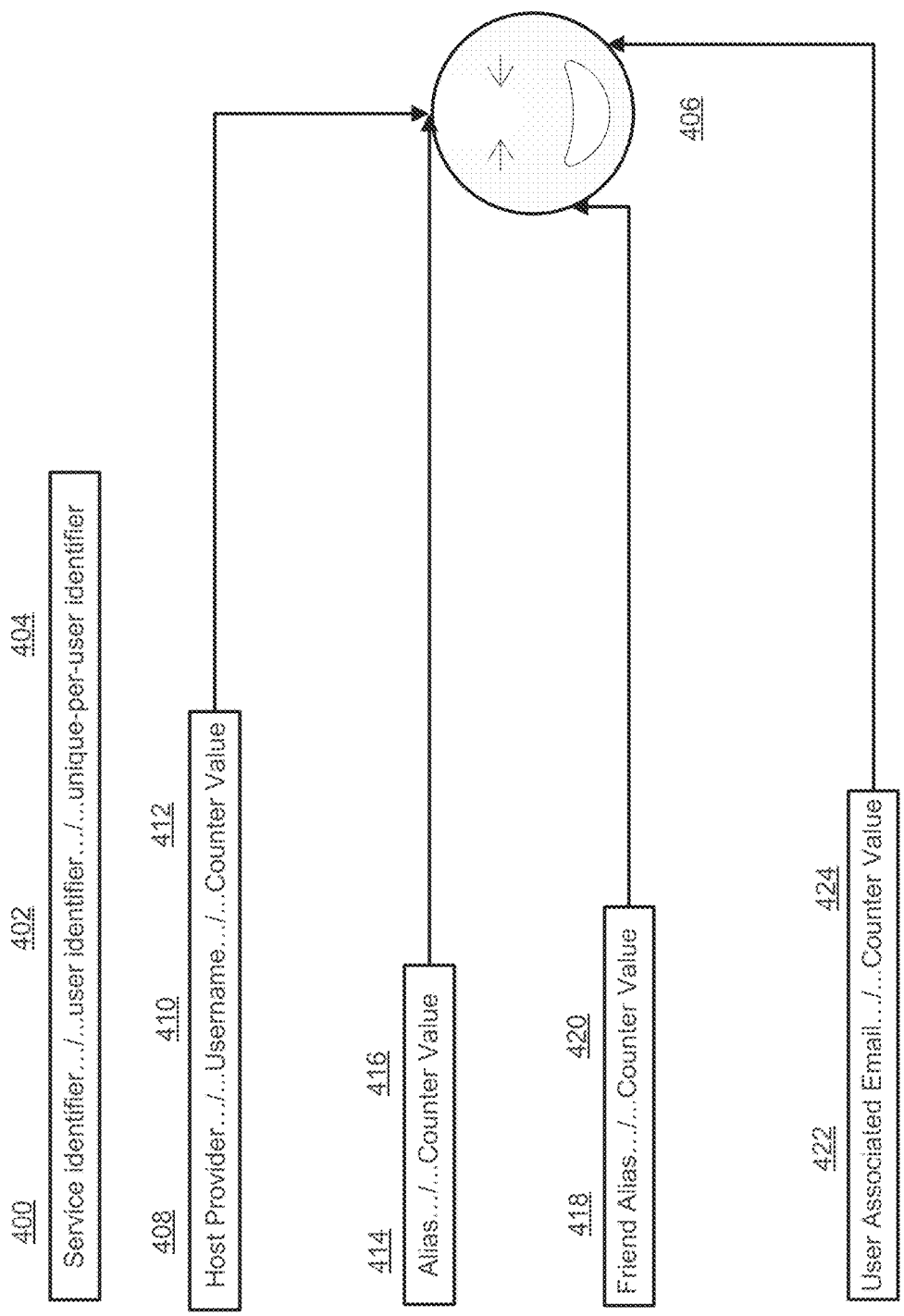
FIG. 4 is a schematic diagram illustrating examples of unique uniform resource identifiers corresponding to one media object in accordance with at least one embodiment.

FIG. 4 depicts examples of uniform resource identifiers or uniform resource locators that may be utilized by a user to view the same or different media objects in accordance with at least one embodiment. In this particular example, four different URIs are presented which can correspond to the same media object and arrows are utilized to symbolize the communication between a URI/URL and the media object. In an example, once the user device 204 (FIG. 2) has obtained the actual counter value from the one or more service provider computers 210, a URI is created and assigned/associated with a media object 406. In accordance with at least one embodiment, an example URI may be comprised of a service identifier 400, a user identifier 402, and a unique-per-user identifier 404. The service identifier 400 may be the one or more service provider computers 210 or the third party unique storage location computers 218. The user identifier 402 can be similar to the unique username as described herein. The unique-per-user identifier can correspond to the requested actual counter value or identification information from the remote identifier assignment service 210 as described above and herein. An example URI may contain a host provider name, domain service provider, and/or internet service provider name 408 followed by a unique username 410 that a user has registered for as described above with reference to FIG. 3, and finally a counter value 412 obtained from the remote identifier assignment service 210. The media object 406 may then be stored at and/or accessed with the URI comprised of 408-412. In the present illustrative example the media object 406 can be stored at the location identified by the unique URI 408-412, for example in the third party unique storage location computers 218. In another example, a user 202 may have registered an alias 414 to be associated with the username 410 as described above with reference to FIG. 3. If the user has registered an alias than the user may enter the alias 414 followed by the counter value 416 to view the same media object 406 that can be reached by the URI described above.

In accordance with at least one embodiment, a user may be provided an option to allow friends or a limited amount of people to access their media files by utilizing their alias. For example, if a user has indicated that his media files may be publicly available as described in FIG. 3 than a separate user need only utilize the alias 418 and the counter value 420 to access the associated media object 406. An example would be "john/4302", which would display the 4302$^{nd}$ picture associated with the alias John. In yet another embodiment, a user may utilize some of their personal identification information to access their media objects via the naming scheme described above. For example, a user or a friend who has access to the user's information may utilize an email address 422 with the counter value 424 to access the media object 406. An example would be "john@mail.com/4302". As described above a user may utilize a range of counter values to access a gallery of media objects. For example a user could enter "john/4302-4400" to view the corresponding images in a gallery view or submit the gallery range for use in web page development. In another embodiment, a user may, in a web browser such as browser 206, append modifying variables to the URL or URI to perform modifications to the media object. For example if a user were to submit "john/4302/large" a larger resolution media object may be returned to the user via the browser 206. Modifying variables include size, color, texture, rotation, or any suitable variables that can be applied to a media object.

Figure 5:
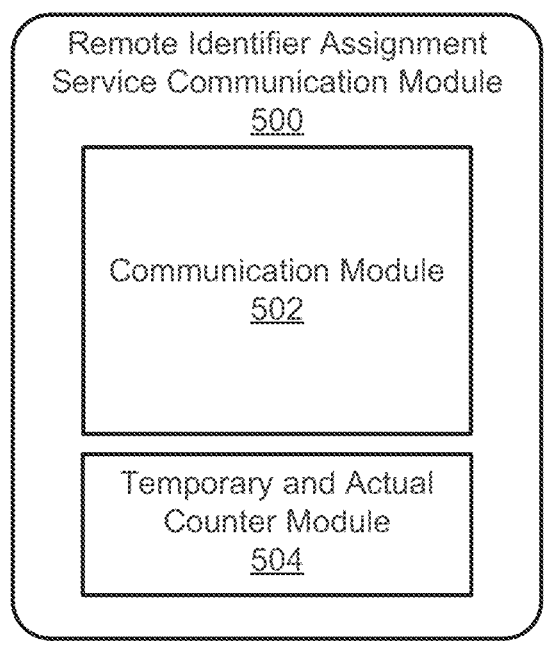
FIG. 5 is a schematic diagram depicting aspects of an example remote identifier assignment service communication module in accordance with at least one embodiment.

FIG. 5 depicts aspects of an example remote identifier assignment service communication module 500 which may be an example of module 214. In accordance with at least one embodiment, the remote identifier assignment service communication module 500 may communicate or request username and counter value or identification information from the remote identifier assignment service 210 via one or more networks 208. An example URI created after the request for a username could include "wpix/john32/4302", in a format described above with reference to FIG. 4. The remote identifier assignment service communication module 500 may be responsible for assigning/associating temporary and actual counter values to one or more media objects via the temporary and actual counter module 504. The communication of requests may be carried out via the communication module 502 which may be in communication with the remote identifier assignment service 210 or the third party unique storage location computers 218. The communication module 502 may also be responsible for communicating the actual counter value or identification information to the uniform resource locator module 600. The communication via the communication module 502 can be via the networks 208.

In accordance with at least one embodiment, while multiple modules are described in the example remote identifier assignment service communication module 500, the processes and methods described herein can be performed by more or less modules within memory such as memory 220 described above. In addition, while the modules 500, 502, and 504 are displayed and described as distinct modules, in accordance with at least one embodiment they may be included within one another to further facilitate methods and systems described herein. Also, in accordance with at least one embodiment, the described processes and architectures described below can be performed either in real-time or in an offline mode prior to requesting actual counter values or obtaining access to one or more public networks 208.

Figure 6:
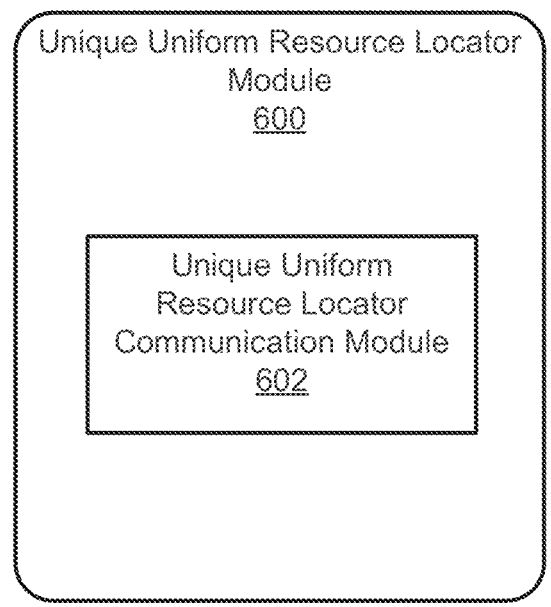
FIG. 6 is a schematic diagram depicting aspects of an example unique uniform resource locator module in accordance with at least one embodiment.

FIG. 6 depicts aspects of an example unique uniform resource locator module 600 which may be an example of module 216. In accordance with at least one embodiment, the unique uniform resource locator module 600 may communicate with the communication module 502 to receive or obtain the unique username and counter value or identification information. The unique uniform resource locator module 600 may be responsible for creating or assigning/associating the URL or URI to a media object as described above. In accordance with at least one embodiment, once the media object has an associated URL or URI the unique uniform resource locator communication module 602 may continuously attempt to move or provide the media object to the storage location indicated by the unique URL or URI. As described above, the unique uniform resource locator communication module may also limit the moving or providing of media objects in accordance with user preferences in relation to bandwidth concerns. In accordance with at least one embodiment, while multiple modules are described in the example unique uniform resource locator module 600, the processes and methods described herein can be performed by more or less modules within memory such as memory 220 described above. In addition, while the modules 600 and 602 are displayed and described as distinct modules, in accordance with at least one embodiment they may be included within one another to further facilitate methods and systems described herein. Also, in accordance with at least one embodiment, the described processes and architectures described below can be performed either in real-time or in an offline mode prior to requesting actual counter values or obtaining access to one or more public networks 208.

Figure 7:
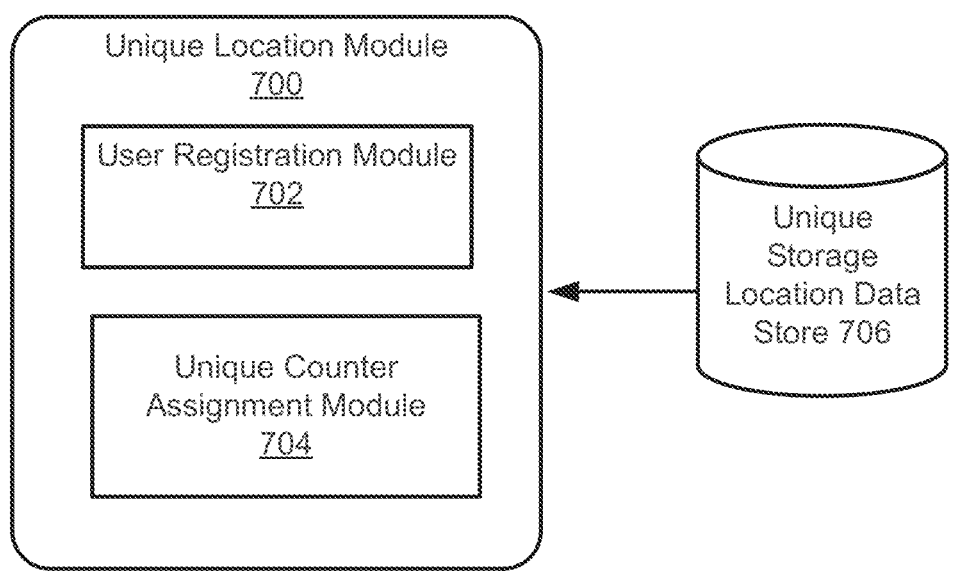
FIG. 7 is a schematic diagram depicting aspects of an example unique location module and an associated data store in accordance with at least one embodiment.

FIG. 7 depicts aspects of an example unique location module 700 which may be an example of module 230. In accordance with at least one embodiment, the unique location module 700 may communicate with the communication module 502 to fulfill a request for a unique username via the user registration module 702 and maintain and assign a counter value or identification information associated with a username via the unique counter assignment module 704. In some examples, the unique location module 700 may be in communication with one or more data stores such as unique storage location data store 706, which may be an example of data store 228, to act as the unique storage location indicated by the unique URI or URL associated with a media object. As described above, in accordance with at least one embodiment, the unique location module 700 receives a request or information corresponding to a new username request and registration. The user registration module 702 may be responsible for maintaining the unique username, ensuring the username is unique and, in accordance with at least one embodiment, providing suggested usernames. The request can be fulfilled by communicating with the modules 500, 502, and 504 via the networks 508.

The unique counter assignment module 704 may, in accordance with at least one embodiment, receive and fulfill requests for counter values, increment values, or identification information. The unique counter assignment module 704 may maintain the counter values and this process may be performed in real time. The unique counter assignment module 704 may also communicate with one or more data stores, such as 706, to help maintain the counter values or identification information associated with each unique username that has been created by the user registration module 702. As described above, in accordance with at least one embodiment, the unique location module 700 may also be responsible for receiving media objects and placing them in the storage location such as data store 706 or third party unique storage location computer 218. The communication of the media object to the third party unique storage location computer 218 or to the unique location module may occur via one or more networks 208. In yet another embodiment, the unique location module 700 may also fulfill requests for access to the media object that is stored in data store 706 by identifying the unique location associated with the URI or URL provided by, in some examples, the browser application 206 of a user. In accordance with at least one embodiment, while multiple modules are described in the example unique location module 700, the processes and methods described herein can be performed by more or less modules within memory such as memory 220 described above. In addition, while the modules 700, 702, and 704 are displayed and described as distinct modules, in accordance with at least one embodiment they may be included within one another to further facilitate methods and systems described herein. Also, in accordance with at least one embodiment, the described processes and architectures described below can be performed either in real-time or in an offline mode prior to requesting an actual counter value via communication through one or more public networks 208.

Figure 8:
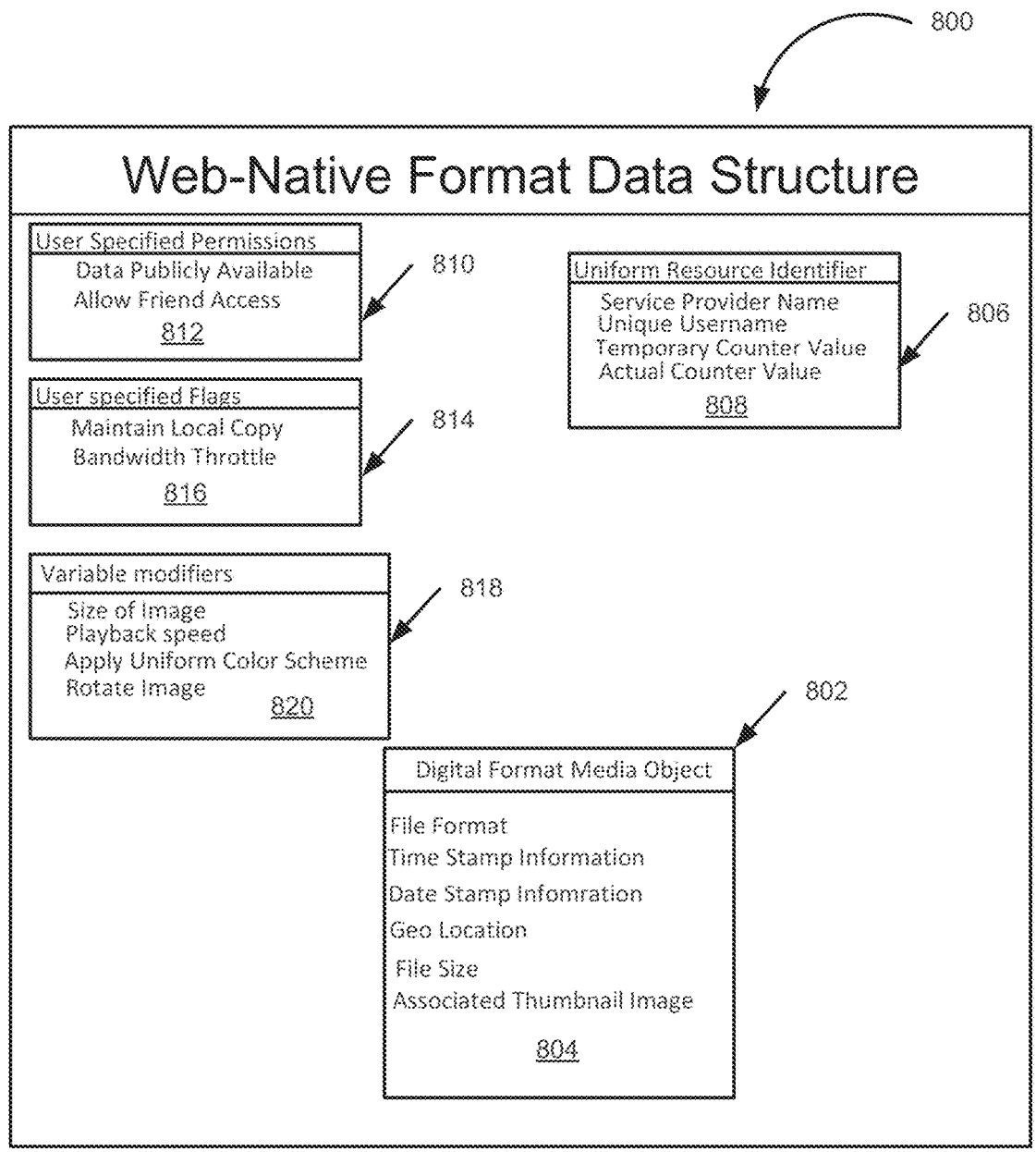
FIG. 8 is a schematic diagram depicting aspects of an example web-native format data structure in accordance with at least one embodiment.

FIG. 8 depicts aspects of an example web-native format data structure 800. In accordance with at least one embodiment, the data structure 800 may include a digital format of a media object 802. The digital format media object 802 may be any suitable media object described above in the present disclosure. In accordance with at least one embodiment, the digital format media object 802 may also contain associated file metadata 804. The file metadata 804 may include at least a file format, time and date stamp information, geo location, file size, an associated thumbnail image, and any suitable metadata that may be associated with a media file as known in the art. In accordance with at least one embodiment, the data structure 800 may include a uniform resource identifier component 806. The uniform resource identifier component 806 may be comprised of several URI variables 808. The URI variables may include at least a service provider name/domain service name provider, a unique username or subdirectory provided by the service provider, a temporary counter value, and an actual counter value. As described above in FIGS. 5-7, the uniform resource identifier is associated or assigned to the media object and a user device/capture device may continuously attempt to move or provide the media object to the location identified by the URI.

In accordance with at least one embodiment, the data structure 800 may also include user specified permissions 810. The user specified permissions 810 may be specified during the unique username registration as described above in FIG. 3 and may include permission options 812 to make the user's data publically available or to allow friends access to media objects via aliases or personal identification information of the user as described above in FIG. 4. In accordance with at least one embodiment, the data structure 800 may additionally include user specified flags 814. The user specified flags 814 may be specified when the media object is created by a capture device or communicated to a user device. The user specified flags 814 may also generally be specified in a similar manner as the user specified permissions 810 during registration of a unique username as described in FIG. 3. The user specified flags 814 may include at least user specified options 816 for a flag for indicating whether a user would like to preserve a local copy of the media object in addition to storing the media object at the location identified by the URI, and whether the user would prefer the continuous moving or uploading behavior of the media object to be throttled by bandwidth concerns. In accordance with at least one embodiment, the data structure 800 may include variable modifiers 818. The variable modifiers can be appended by a user to the end of a URI request in order to modify the media object. For example, as described above, a user may enter a URI corresponding to "wpix/john23/4302/large" to request an increased resolution image of the 4302 image associated with the username john23. The variable modifiers 818 may include one or more variables 820 including at least a size of an image (larger or smaller), the playback speed (fast or slow) of a media file, the application of a uniform color scheme, or the ability to rotate an image.

Figure 9:
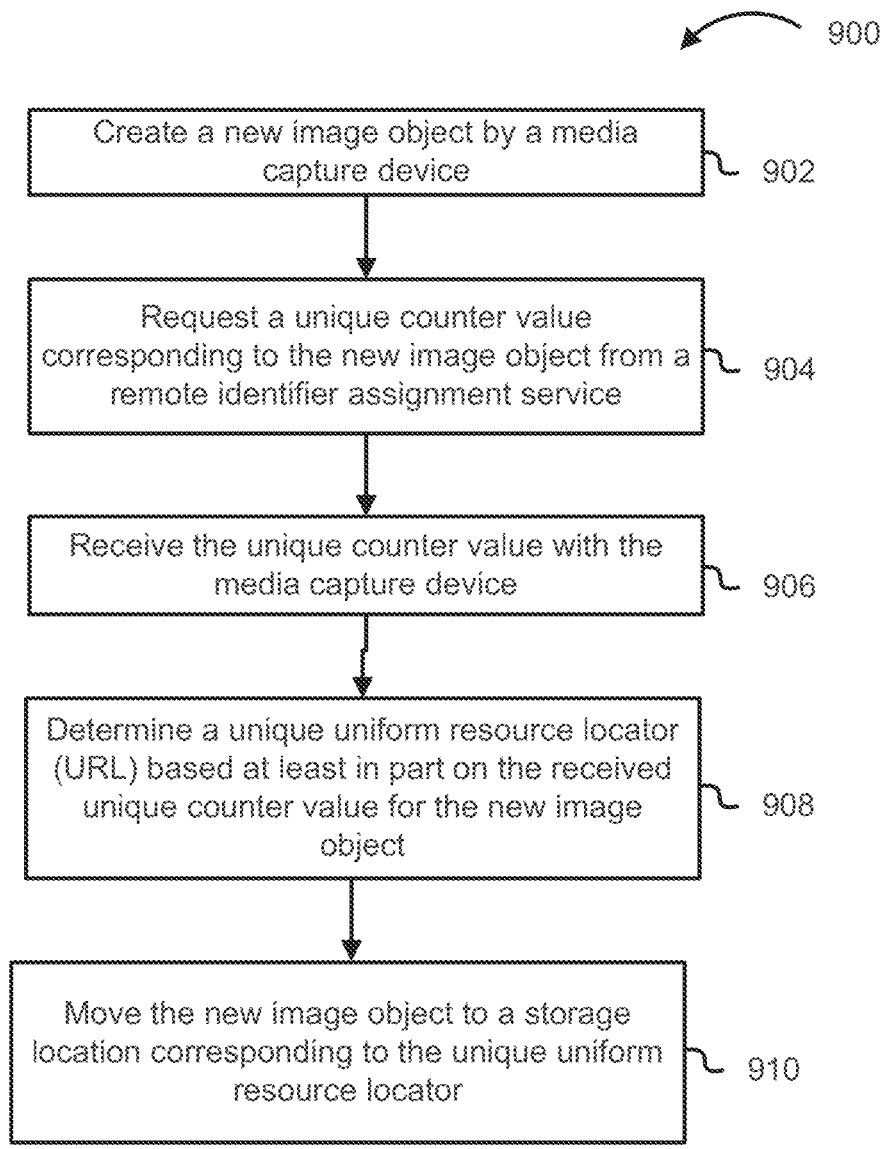
FIG. 9 is a flow diagram illustrating an example process for storing a new image object to a determined unique uniform resource locator in accordance with at least one embodiment.
Figure 10:
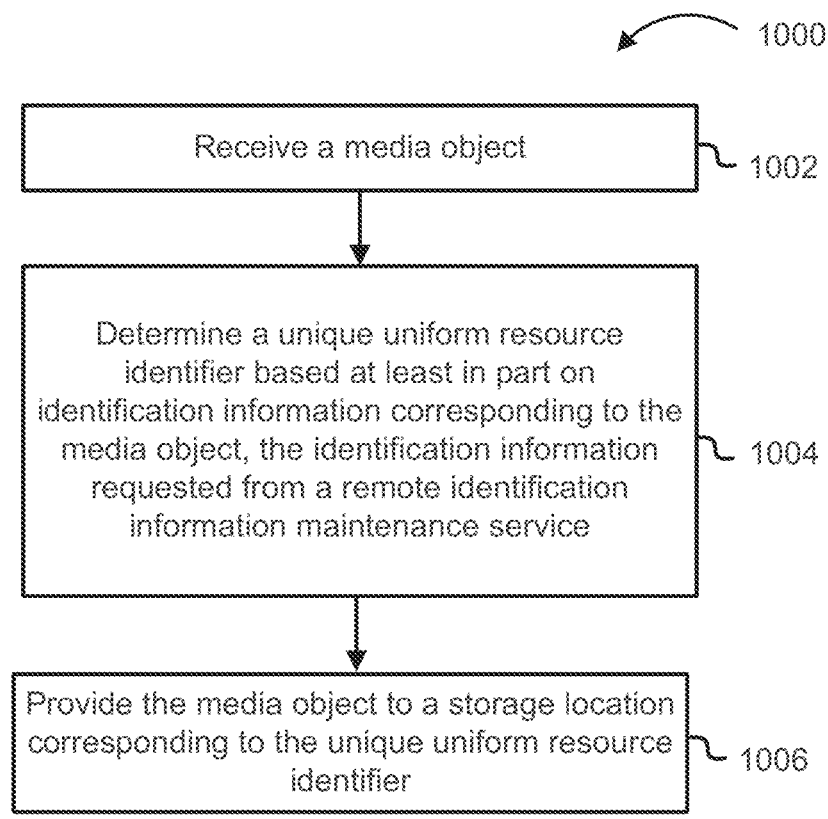
FIG. 10 is a flow diagram illustrating an example process for providing a media object to a location corresponding to a unique uniform resource identifier in accordance with at least one embodiment.

FIGS. 9 and 10 illustrate example flow diagrams showing respective processes 900 and 1000 for maintaining web-native format for media objects, according to at least a few examples. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any suitable number of the described operations can be combined in any suitable order and/or in parallel to implement the processes.

Additionally, some, any, or all of the processes (or any other suitable processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. In accordance with at least one embodiment, the code may be stored on a computer-readable storage medium, for example, in the form of a computer program comprising a plurality of instructions executable by one or more processors. The computer-readable storage medium may be non-transitory.

In some examples, the one or more service provider computers 210 (e.g., utilizing at least the remote identifier assignment service communication module 500, the unique uniform resource locator module 600, the unique location module 700, and the one or more data stores 7-6) shown in FIG. 2, and 5-7 may perform the processes of FIGS. 9 and 10. The process 900 may begin at 902 by creating a new image object by a media capture device. In some examples, the process 900 may also include receiving an image object by a computer device or user device. The media capture device can be any of the user devices 204 described above. At 904, the process 900 may include requesting a unique counter value corresponding to the new image object from a remote identifier assignment service. In accordance with at least one embodiment, the remote identifier assignment service communication module 500 via the communication module 502 and networks 208 may request the unique counter value from the unique counter assignment module 704. Additionally, the remote identifier assignment service can be the remote identifier assignment service/one or more service provider computers 210 or the third party unique storage location computers 218.

At 906, the process 900 may also include receiving the unique counter value with the media capture device. As described above, in some examples, the temporary and actual counter module 504 via the communication module 502 may receive the unique counter value. At 908, the process 900 further continues by determining a unique uniform resource locator (URL) based at least in part on the received unique counter value for the new image object. In an example, the unique uniform resource locator module 600 may determine the URL and assign or associate the URL with the new image object. The unique uniform resource locator communication module 600 may be in communication with the communication module 502 in order to receive the unique username and counter value to create the URL according to at least one embodiment. Further, the process 900 may end at 910, where the process 900 may include moving the new image object to a storage location corresponding to the unique uniform resource locator. In accordance with at least one embodiment the media capture device 204 utilizes the unique uniform resource locator communication module 602 to move the new image object to the unique storage location data store 228 or the third party unique storage location computers 218 via networks 208. The unique uniform resource locator module 600 may also be in communication with the unique location module 700 of the remote identifier assignment service 210 to successfully move and store the new image object to the storage location indicated by the associated URL of the new image object.

FIG. 10 illustrates an example flow diagram showing a process 1000 for determining a unique uniform resource identifier for a media object and providing the media object to a storage location corresponding to the unique uniform resource identifier. The process 1000 may begin at 1002 by receiving a media object. The media object may be received by any of the user devices 204 or communicated to the user devices 204 via a local area network or one or more public networks such as networks 208. The process 1000 may continue at 1004 by determining a unique uniform resource identifier based at least in part on identification information corresponding to the media object. The identification information may be requested from a remote identification information maintenance service.

The determination of the unique uniform resource identifier can be performed by the unique uniform resource locator module 600 in communication with the communication module 502 via the unique uniform resource locator communication module 602. The requesting of the identification information may be performed by the temporary and actual counter module 504 in communication with the unique counter assignment module 704 via one or more networks 208 as described above. The process 1000 may conclude at 1006 by providing the media object to a storage location corresponding to the unique uniform resource identifier. In accordance with at least one embodiment the media capture device 204 utilizes the unique uniform resource locator communication module 602 to provide the media object to the unique storage location data store 228 or the third party unique storage location computers 218 via networks 208 as described in FIG. 9 above. The unique uniform resource locator module 600 may also be in communication with the unique location module 700 of the remote identifier assignment service 210 to successfully move and store the new image object to the storage location indicated by the associated URL of the media object.

Figure 11:
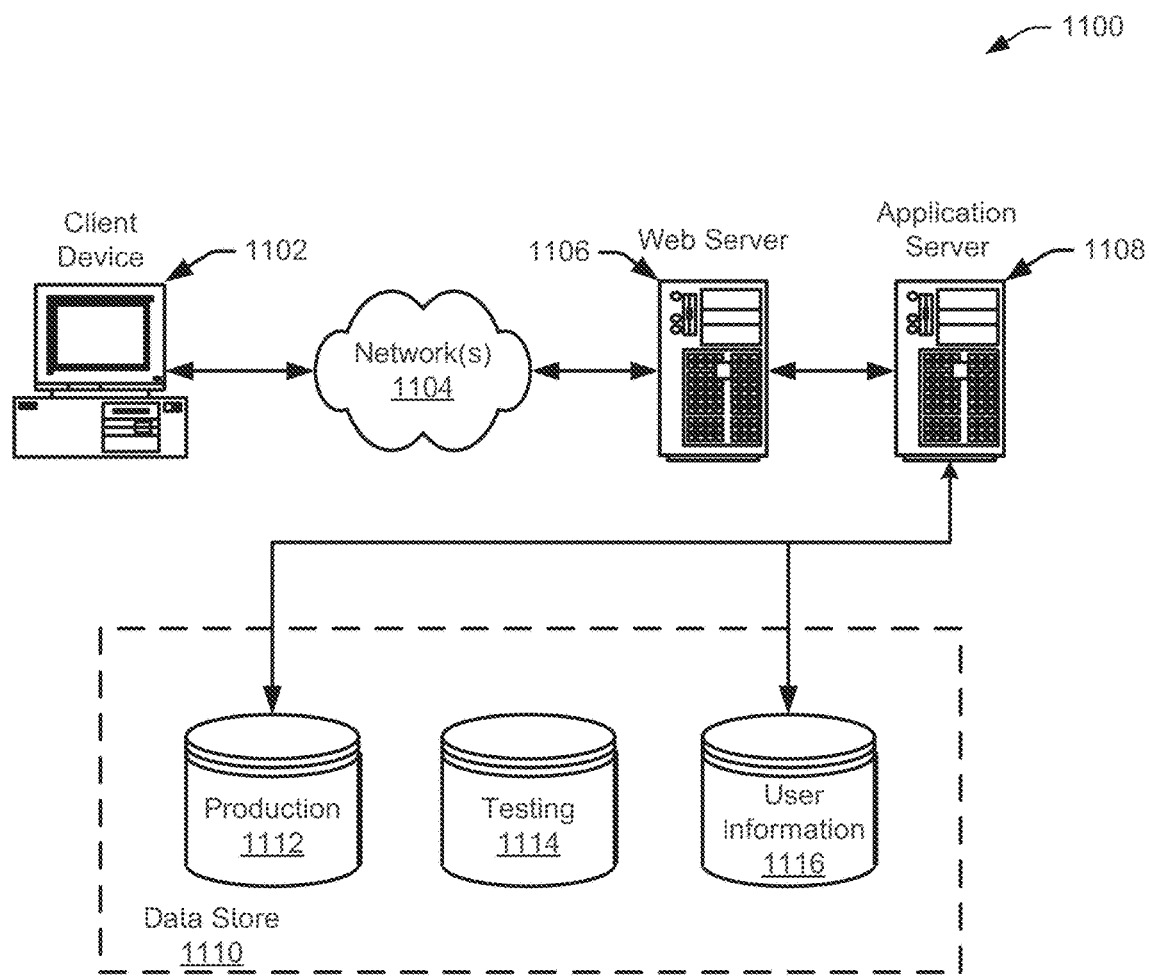
FIG. 11 is a schematic diagram illustrating an example environment in which various embodiments of the web-native maintenance media file format can be implemented in accordance with at least one embodiment.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any suitable device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any suitable network, including an intranet, the Internet, a cellular network, a local area network or any other such suitable network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any suitable device or combination of devices capable of storing, accessing and retrieving data, which may include any suitable combination and number of data servers, databases, data storage devices and data storage media, in any suitable standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 1 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"). Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "or" is to be construed as inclusive, so that "A or B" means "A or B or both," unless otherwise indicated herein or clearly contradicted by context. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for managing content online comprising:
   under the control of one or more computer systems configured with executable instructions,
      creating a new image object by a media capture device;
      assigning, by the media capture device, a temporary counter value to the new image object;
      determining, with the media capture device, a unique uniform resource locator (URL) for the new image object based at least in part on the temporary counter value, the unique uniform resource locator serving as an identifier of the new image object independent of a file name associated with the new image object and independent of a file type associated with the new image object;
      requesting a unique counter value corresponding to the new image object from a remote identifier assignment service;
      receiving the unique counter value with the media capture device;
      determining, with the media capture device, the unique uniform resource locator for the new image object based at least in part on replacing the temporary counter value with the received unique counter value;

transmitting, by the media capture device, the new image object to a storage location corresponding to the unique uniform resource locator;

deleting, by the media capture device, a local copy of the new image object from the media capture device in response to transmitting the new image object to the storage location corresponding to the unique uniform resource locator; and accessing a plurality of image objects from the storage location that corresponds to the unique uniform resource locator, the plurality of image objects accessed based at least in part on input that comprises a structure of an alias associated with the unique uniform resource locator and a plurality of unique counter values that correspond to the plurality of image objects, each unique counter value corresponding to a particular image object of the plurality of image objects.

2. The computer-implemented method of claim 1 wherein the new image object includes at least one of a media stream file, a movie file, a STL file, or a data file.

3. A computer-implemented method for managing content online comprising:

under the control of one or more computer systems configured with executable instructions, receiving, by a computing system, a media object;

assigning, by the computing system, a temporary counter value to the media object;

determining, by the computing system, a unique uniform resource identifier for the media object based at least in part on the temporary counter value, the unique uniform resource identifier serving as an identifier of the media object independent of a file name associated with the media object and independent of a file type associated with the media object;

determining the unique uniform resource identifier based at least in part on replacing the temporary counter value with identification information corresponding to the media object, the identification information requested from a remote identification information maintenance service;

providing the media object to a storage location corresponding to the unique uniform resource identifier; and accessing a plurality of media objects from the storage location that corresponds to the unique uniform resource identifier, the plurality of media objects accessed based at least in part on input that comprises a structure of an alias associated with the unique uniform resource identifier and a plurality of unique counter values that corresponds to the plurality of media objects, each unique counter value corresponding to a particular media object of the plurality of media objects.

4. The computer-implemented method of claim 3 wherein providing the media object includes moving the media object to the storage location corresponding to the unique uniform resource identifier and deleting a local cache version of the media object from the computing system.

5. The computer-implemented method of claim 3 wherein providing the media object to the storage location includes communicating via one or more public networks.

6. The computer-implemented method of claim 3 wherein the media object includes one or more user specified flags.

7. The computer-implemented method of claim 6 wherein the one or more user specified flags indicate the local cache version of the media object should not be deleted.

8. The computer-implemented method of claim 3 wherein the media object contains metadata.

9. The computer-implemented method of claim 8 wherein the metadata includes at least one of file format, time stamp information, date stamp information, geo location, file size, or thumbnail image.

10. A non-transitory computer readable medium encoded with a data structure that configures one or more computers to manage content online, the data structure comprising:

a digital format of a media object created by a media capture device; and a unique uniform resource identifier corresponding to the media object based at least in part on identification information, the identification information received from an identifier assignment service being remote with respect to the media capture device, the unique uniform resource identifier serving as an identifier of the media object independent of a file name associated with the media object and independent of a file type associated with the media object, wherein the data structure configures the one or more computers to provide the media object for presentation to a user at least in part by communicating the media object to a storage location corresponding to the uniform resource identifier; and wherein the data structure configures the one or more computers to access a plurality of media objects from the storage location that corresponds to the uniform resource identifier, the plurality of media objects accessed based at least in part on input that comprises a structure of an alias associated with the uniform resource identifier and a plurality of unique counter values that correspond to the plurality of media objects, each unique counter value corresponding to a particular media object of the plurality of media objects.

11. The non-transitory computer readable medium of claim 10 wherein the media capture device includes at least one of a mobile device, a notebook computer, a desktop computer, a camera, a digital camera, a camcorder, a 3D scanner, a 3D printer, a virtual environment, or a gaming device.

12. The non-transitory computer readable medium of claim 10 wherein the identifier assignment service is implemented at least in part by a domain name service (DNS).

13. A computerized system for managing content online, comprising:

one or more processors; and memory including instructions that, when executed by the one or more processors, cause the system to at least:

receive a new media object;

assign a temporary counter value to the new media object;

determine a unique uniform resource identifier for the new media object based at least in part on the temporary counter value;

request identification information from a remote identifier assignment service associated with the new media object;

determine the unique uniform resource identifier for the new media object based at least in part on replacing the temporary counter value with the requested identification information, the unique uniform resource identifier serving as an identifier of the new media object independent of a file name associated with the new media object and independent of a file type associated with the new media object;

provide the new media object to a storage location identified by the unique uniform resource identifier; and access a plurality of media objects from the storage location that corresponds to the unique uniform resource identifier, the plurality of media objects accessed based at least in part on input that comprises a structure of an alias associated with the unique uniform resource identifier and a plurality of unique counter values that correspond to the plurality of media objects, each unique counter value corresponding to a particular media object of the plurality of media objects.

14. The computerized system of claim 13 wherein the instructions further cause the system to:

register the unique uniform resource identifier with the remote identifier assignment service subsequent to requesting the identification information from the remote identifier assignment service.

15. The computerized system of claim 14 wherein registering the unique uniform resource identifier includes registering one or more aliases associated with the unique uniform resource identifier.

16. The computerized system of claim 14 wherein registering the unique uniform resource identifier includes associating a user's personal information with the unique uniform resource identifier.

17. The computerized system of claim 13 wherein the instructions further cause the system to:

assign the temporary counter value to the new media object when the computerized system is inaccessible via one or more public networks; and replace the temporary counter value with the identification information from the remote identifier assignment service when the computerized system is accessible via the one or more public networks.

18. The computerized system of claim 13 wherein the instructions further cause the system to:

register a new unique uniform resource identifier from a different remote identifier assignment service;

request the identification information from the different remote identifier assignment service associated with the new media object;

determine the new unique uniform resource identifier based at least in part on the identification information; and provide the new media object to the storage location identified by the new unique uniform resource identifier.

19. The computerized system of claim 18 wherein the instructions further cause the system to:

move media objects associated with the unique uniform resource identifier to the new unique uniform resource identifier.

20. The computerized system of claim 13 wherein the instructions further cause the system to:

receive, from a user device, a request to retrieve the new media object, the request including information identifying modifiers to be applied to presentation of the new media object; and provide, to the user device, an updated media object based at least in part on the new media object and the modifiers.

21. The computerized system of claim 13 wherein providing the new media object to the storage location includes determining whether providing the new media object exceeds a data limit associated with the computerized system.

22. The computerized system of claim 13 wherein a different unique uniform resource identifier is determined based at least in part on a detection of a new source of the requested identification information.

23. The computerized system of claim 22 wherein the new source includes at least one of a new device, a new geo location, a new internet protocol address, or new machine identification information.

* * * * *